US011599579B1

(12) United States Patent
Nadav et al.

(10) Patent No.: US 11,599,579 B1
(45) Date of Patent: *Mar. 7, 2023

(54) ANOMALY VISUALIZATION FOR COMPUTERIZED MODELS

(71) Applicant: Wells Fargo Bank, N.A., San Francisco, CA (US)

(72) Inventors: Carmel Nadav, Eagan, MN (US); Manish Pandey, Bangalore (IN); Connor Patrick Jennings, Des Moines, IA (US); Mahima Rawat, New Delhi (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/305,439

(22) Filed: Jul. 7, 2021

Related U.S. Application Data

(63) Continuation of application No. 16/716,341, filed on Dec. 16, 2019, now Pat. No. 11,074,302.
(Continued)

(51) Int. Cl.
*G06F 16/904* (2019.01)
*G06Q 20/40* (2012.01)
*G06N 5/045* (2023.01)

(52) U.S. Cl.
CPC ........... *G06F 16/904* (2019.01); *G06N 5/045* (2013.01); *G06Q 20/4016* (2013.01)

(58) Field of Classification Search
CPC ... G06F 16/904; G06N 5/045; G06Q 20/4016
See application file for complete search history.

(56) References Cited

U.S. PATENT DOCUMENTS 7,765,293 B2 7/2010 Adams et al.
8,260,658 B2 9/2012 Fenstermaker et al.
(Continued)

OTHER PUBLICATIONS

Yang Shi, Yuyin Liu, Hanghang Tong, Jingrui He, Gang Yan, Nan Cao, Visual Analytics of Anomalous User Behaviors: A Survey, May 21, 2019, 24 pages (Year: 2019).*
(Continued)

*Primary Examiner* — Yongjia Pan
(74) *Attorney, Agent, or Firm* — Schwegman Lundberg & Woessner, P.A.

(57) ABSTRACT

Various examples are directed to systems and methods for visualizing computerized model decisions. A model system may access result data that comprises event results for a plurality of events and event feature data describing sets of event features. A first event result for a first event of the plurality of events is generated using the computerized model and a first set of event features from the event feature data. The model system may access importance score data comprising importance scores for at least a portion of the first set of event features, wherein a first event feature is assigned a first importance score and a second event feature is assigned a second importance score indicating a greater importance than the first importance score. The model system may also generate a user interface for display to a human user. The user interface may comprise a background area; a first visual indicator positioned on the background area and corresponding to the first event feature. A size of the first visual indicator may correspond to the first importance score. A second visual indicator may be positioned on the background area and corresponding to the second event feature. A size of the second visual indicator corresponds to the second importance score and is larger than the size of the first visual indicator. The model system may display the user interface at a display screen of a computing device.

17 Claims, 8 Drawing Sheets

Related U.S. Application Data

(60) Provisional application No. 62/890,268, filed on Aug. 22, 2019.

(56) References Cited

U.S. PATENT DOCUMENTS

| | | | |
|---|---|---|---|
| 8,275,399 B2* | 9/2012 | Karmarkar | H04L 67/52 455/403 |
| 9,309,747 B2 | 4/2016 | Dankers et al. | |
| 9,936,066 B1 | 4/2018 | Mammen et al. | |
| 10,685,398 B1* | 6/2020 | Olson | G06Q 20/24 |
| 2005/0039163 A1 | 2/2005 | Barrett et al. | |
| 2007/0087797 A1 | 4/2007 | Van Luchene et al. | |
| 2009/0064282 A1 | 3/2009 | Li | |
| 2010/0293270 A1 | 11/2010 | Raitza et al. | |
| 2012/0030244 A1 | 2/2012 | John et al. | |
| 2012/0150859 A1 | 6/2012 | Hu | |
| 2012/0158871 A1* | 6/2012 | Amano | H04L 67/00 709/206 |
| 2012/0173495 A1 | 7/2012 | Stading et al. | |
| 2012/0254333 A1 | 10/2012 | Chandramouli et al. | |
| 2013/0054259 A1 | 2/2013 | Wojtusiak et al. | |
| 2014/0254772 A1* | 9/2014 | Williams | H04M 3/24 379/32.01 |
| 2015/0235243 A1 | 8/2015 | Wilson et al. | |
| 2016/0035115 A1 | 2/2016 | Krajec | |
| 2016/0042287 A1 | 2/2016 | Eldardiry et al. | |
| 2016/0048788 A1 | 2/2016 | Martin et al. | |
| 2016/0048938 A1 | 2/2016 | Jones et al. | |
| 2016/0378859 A1 | 12/2016 | Banik et al. | |
| 2017/0154107 A1 | 6/2017 | Awad et al. | |
| 2017/0192872 A1 | 7/2017 | Awad et al. | |
| 2017/0269899 A1* | 9/2017 | Spiessbach | G06F 40/169 |
| 2018/0005203 A1 | 1/2018 | Grassadonia et al. | |
| 2018/0247220 A1 | 8/2018 | Assem Aly Salama et al. | |
| 2018/0350006 A1 | 12/2018 | Agrawal et al. | |
| 2021/0034994 A1* | 2/2021 | Stocker | G06N 5/04 |

OTHER PUBLICATIONS

Weiwei Cui, Yingcai Wu, Shixia Liu, Furu Wei, Michelle Zhou, Huamin Qu, Context-Preserving, Dynamic Word Cloud Visualization, Dec. 2010, 12 pages (Year: 2010).*

"U.S. Appl. No. 16/716,341, Advisory Action dated Feb. 23, 2021".

"U.S. Appl. No. 16/716,341, Examiner Interview Summary dated Mar. 12, 2021".

"U.S. Appl. No. 16/716,341, Final Office Action dated Dec. 15, 2020".

"U.S. Appl. No. 16/716,341, Non Final Office Action dated Jun. 25, 2020".

"U.S. Appl. No. 16/716,341, Notice of Allowance dated Mar. 25, 2021", 8 pgs.

"U.S. Appl. No. 16/716,341, Response filed Feb. 15, 2021 to Final Office Action dated Dec. 15, 2020".

"U.S. Appl. No. 16/716,341, Response filed Mar. 10, 2021 to Advisory Action dated Feb. 23, 2021", 13 pgs.

"U.S. Appl. No. 16/716,341, Response filed Sep. 25, 2020 to Non Final Office Action dated Jun. 25, 2020", 11 pgs.

Domingues, Remi, et al., "A comparative evaluation of outlier detection algorithms: experiments and analyses", Preprint submitted to Elsevier—Aug. 20, 2018, [Online]. [Accessed Aug. 31, 2019], Retrieved from the Internet: <URL: https://www.researchgate.net/publication/320025854_A_comparative_evaluation_of_outlier_detection_algorithms_Experiments_and_analyses>, 27 pgs.

Dong, Jiayun, et al., "Variable Importance Clouds: A Way to Explore Variable Importance for the Set of Good Models", Cornell University; arXiv:1901.03209v1, (Jan. 2019), 43 pgs.

Doshi-Velez, Finale, et al., "Towards a Rigorous Science of Interpretable Machine Learning", [Online], [Accessed Aug. 31, 2019], Retrieved from the Internet: <URL: https://arxiv.org/pdf/1702.08608.pdf>, (Mar. 2, 2017), 13 pgs.

Kiran, B. Ravi, et al., "An overview of deep learning based methods for unsupervised and semi-supervised anomaly detection in videos", [Online], [Accessed Aug. 31, 2019], Retrieved from the Internet: <URL: https://arxiv.org/pdf/1801.03149.pdf>, (Jan. 30, 2018), 15 pgs.

Molnar, Christoph, "Interpretable Machine Learning. A Guide for Making Black Box Models Explainable", Section 5.7 Local Surrogate (LIME), [Online], [Accessed Nov. 26, 2018], Retrieved from the Internet: <URL: http://web.archive.org/web/20181126133431/https://christophm.github.io/interpretable-ml-book/>, (Nov. 23, 2018), 14 pgs.

Ras, Gabrielle, et al., "Explanation Methods in Deep Learning: Users, Values, Concerns and Challenges", [Online], [Accessed Aug. 31, 2019], Retrieved from the Internet: <URL: https://arxiv.org/pdf/1803.07517.pdf>, (Mar. 29, 2018), 15 pgs.

Rettig, Laura, et al., "Online anomaly detection over big data streams", In 2015 IEEE International Conference on Big Data; pp. 1113-1122, (Oct. 1, 2015), 10 pgs.

Ribeiro, Marco Tulio, et al., "Why Should I Trust You?", KDD '16 Proceedings of the 22nd ACM SIGKDD International Conference on Knowledge Discovery and Data Mining; pp. 1135-1144, [Online]. Retrieved from the Internet: <URL: https://dl.acm.org/citation.cfm?doid=2939672.2939778>, (Aug. 9, 2016), 10 pgs.

Sarkar, Dipanjan, "Hands-on Machine Learning Model Interpretation", [Online]. [Accessed Aug. 31, 2019], Retrieved from the Internet: <URL: https://towardsdatascience.com/explainable-artificial-intelligence-part-3-hands-on-machine-learning-model-interpretation-e8ebe5afc608>, (Dec. 13, 2018), 41 pgs.

* cited by examiner

ANOMALY VISUALIZATION FOR COMPUTERIZED MODELS

CROSS-REFERENCE TO RELATED APPLICATION

This patent application is a continuation of U.S. patent application Ser. No. 16/716,341, filed Dec. 16, 2019, which claims the benefit of U.S. Provisional Patent Application No. 62/890,268, filed Aug. 22, 2019, each of which are incorporated by reference herein in their entirety.

TECHNICAL FIELD

Embodiments described herein generally relate to computerized systems and methods for fraud prevention.

BACKGROUND

Computerized models are used in many contexts including, for example, in financial services, network security, healthcare, and marketing, among others. Although modern computerized models can be highly accurate, they are also often opaque, sometimes even to their designers.

DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings.

DETAILED DESCRIPTION

Figure 1:
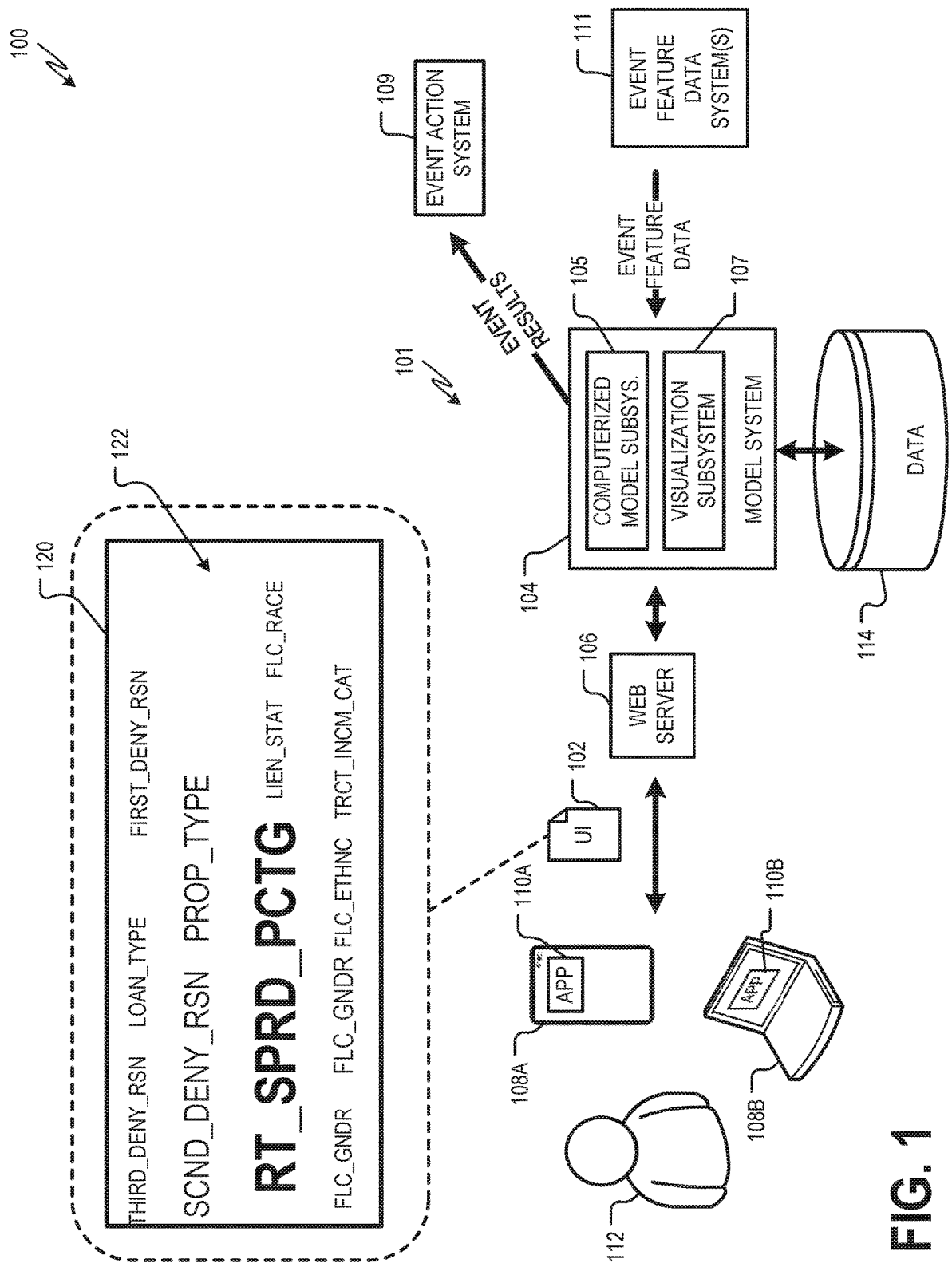
FIG. 1 is a diagram showing one example of an environment for implementing a user interface for visualizing anomalies for a computerized model.

Various examples are directed to systems and methods for visualizing and, in some examples, detecting anomalies in computerized models.

Computerized models are used to process events. An event is a modeled occurrence. An event is described by a set of event features describing or characterizing the event.

Consider an example financial services arrangement in which a computerized model is used to process credit applications. In this example, a credit application is an event that is described by a set of features such as, for example, identifying information about the applicant, the type of loan requested, interest rates, etc. The computerized model classifies a credit application, for example, as accepted or rejected. The classification provided by the computerized model can be a factor in whether a financial institution accepts or rejects the underlying credit application the underlying credit application is accepted or rejected.

Consider another example arrangement in which a computerized model is used to detect suspicious activity on a credit card. In this example, a computed and/or requested credit card transaction is an event that is described by a set of features, such as, for example, an amount of the transaction, a date and time for the transaction, a merchant involved in the transaction, etc. The computerized model classifies a transaction as potentially fraudulent or not potentially fraudulent. The classification provided by the computerized model can be used to accept the transaction, reject the transaction, and/or escalate the transaction to a higher level of security review prior to acceptance.

Consider yet another example arrangement in which a computerized model is used to monitor network traffic. In this example, events include requests to access a computing resource, for example, by reading from and/or writing to the resource. Event features can include, for example, a time of the request, a network address of the sender of the request, a network address of the resource to be accessed, etc. The computerized model classifies an access request based on the level of risk that the access request is nefarious. If an access request is classified as nefarious, then corrective action can be taken.

Depending on structure and design, a computerized model can be easily interpretable or more difficult to interpret. For example, regression models (e.g., linear regression, logistic regression, etc.) are based on a weighted sum of event features. The weight given to the various features is evident in the structure of the model itself. Accordingly, a regression model is interpretable, for example, by examining the weight applied to the various features by the model. Other types of interpretable models include, k-nearest neighbor algorithms, naive Bayes classifiers, some decision tree models, etc. Other models, however, are not as interpretable. For example, a neural network model uses hidden nodes that combine features in a way that is not apparent from the structure of the model itself. Other less-interpretable models include support vector machine (SVM) models, random forest algorithms, etc. Models that are not easily interpretable are sometimes referred to as black box algorithms.

Computerized models using black box algorithms often tend to generate more accurate results than models based on more interpretable algorithms. As a trade-off for more accurate results, however, computerized models using black box algorithms suffer from reduced interpretability. This can cause various practical problems. For example, reduced interpretability can make it more difficult to detect improperly trained models. For example, training data used to train a computerized model may, unbeknownst to a designer, include a pattern that is unlikely to be replicated in live data. Consider an example computerized model for evaluating credit application. If the training data includes a strong correlation between credit applications submitted on Tuesday and credit applications that should be rejected, the computerized model may be inadvertently biased against credit applications submitted on Tuesday. If a computerized model is based on a black box algorithm, it is more difficult to detect such a training problem. Also, in some examples, reduced interpretability can make it more difficult to identify and explain anomalous model results.

In some examples, these problems are relevant when computerized models are used in the financial services. For example, legal and/or practical requirements may make it desirable for financial services institutions to verify and demonstrate that its financial decisions are being made based on proper criteria. For example, it is desirable for a financial institution to verify and demonstrate that financial decisions, such as on credit applications, transaction requests, etc., do not depend on impermissible factors.

There are various techniques for interpreting black box computerized models, such as Locally Interpretable Model Agnostic Explanations (LIME) techniques, Partial Dependence Plot (PDP) techniques, Shapley Additive exPlanations (SHAP), and others. These techniques can be used to generate an importance score indicating the importance of a particular feature (or value thereof) to a particular result of a computerized black box model.

Importance scores, however, are often numerical. Accordingly, viewing and understanding importance scores may not be intuitive and sometimes requires a considerable level of time and sophistication on the part of a human user. For example, it is sometimes desirable to demonstrate the importance of various event features to non-technical personnel, such as, for example, business managers, regulators, etc. Providing numerical, or even ineffective visual representations of event feature importance scores risks a failure to communicate the operations of a computerized model or even a miscommunication.

Various examples described herein address these and other problems by providing systems and methods for visualizing importance scores for event features. A model system receives event result data that describes the results of applying a computerized model to a plurality of events. The event result data includes event results (e.g., a classification of an event made by the computerized model) as well as sets of event features. For example, the event result data may describe, for a first event, an event result and the set of event features that was used to generate the event result with the computerized model. The model system also accesses importance score data describing importance scores for at least a portion of the described event features. The importance score data can be generated in any suitable way, for example, using LIME, SHAP, PDP, or other suitable techniques.

The model system generates a user interface that can be provided to a human user to illustrate the importance scores in an easily-understandable manner. The user interface includes a background area, a first visual indicator of a first event feature and a second visual indicator of a second event feature. The first indicator is positioned on the background area and has a size that corresponds to an importance score of the first event feature. The second indicator is also positioned on the background area and has a size that corresponds to an importance score of the second event feature. The user interface may be displayed at a screen of a computing device, as described herein.

The user interface provides a more advantageous way for the human user to view and understand the underlying computerized model. For example, the user can compare the size of the first indicator and the second indicator to receive a simple sense of the relative importance of the represented features to the event result, and by what quantitative amount. In this way, the human user is more easily able to spot a model that is not properly trained and/or that relies too heavily on an arguably irrelevant feature.

Some examples described herein also utilize improved techniques to determine importance scores for event features. In some examples, a model system reviews event results for a set of events and identifies anomalous events. Anomalous events are events that deviate from other events of the set of events, for example, based on the feature values for the events and/or the result generated for the event by the computerized model. Anomalous events can be detected in any suitable way including, for example, by training a secondary computerized model and training the secondary computerized model to classify anomalous events. The secondary computerized model can be supervised, semi-supervised, or unsupervised. In some examples, one or more anomalous events can be identified by a human user, for example, in addition to being identified by the model system.

Upon identifying anomalous events, the model system identifies feature values of the anomalous events having low frequency relative to the event results (e.g., including anomalous and non-anomalous events). Consider again the credit application example above where an event feature for the credit applications indicates a lien type. The value "second lien" may have a low frequency among the credit applications. Consider also the example above regarding network communications in which an event feature for the access requests is an address of origin. A given address of origin may have a low frequency if a small portion of the considered requests original from that address.

In some examples, the model system, for an anomalous event, identifies event features that have values with a frequency less than a threshold frequency. The model system determines importance scores for the identified event features, for example, based on the frequencies of the values of the identified event features. The determined importance scores can be used in a visualization, for example, as described herein.

FIG. 1 is a diagram showing one example of an environment 100 for implementing a user interface 102 for visualizing anomalies for a computerized model. The environment 100 includes a graphical user interface or UI 102 that is served to one or more user computing device 108A, 108B. In the example of FIG. 1, the UI 102 is served by a web server 106 that is in communication with a model system 104. A computing system 101 for providing the UI 102 to the user 112 may include some or all of the model system 104, a web server 106, and/or the user computing devices 108A, 108B.

The model system 104 includes one or more computing devices that may be at a common geographic location or may be distributed across multiple geographic applications. The model system 104 includes a computerized model subsystem 105 and a visualization subsystem 107, The computerized model subsystem 105 implements a computerized model to generate event results based on event feature data describing event features. The event feature data is received from one or more event feature data systems 111. Different event feature data systems 111 may provide event features for different types of events. For example, if the events are credit applications, the event feature data systems 111 may include one or more systems storing data about credit applications and/or customers making credit applications. In examples in which the events are access requests or otherwise related to computer network security, the event feature data systems 111 may include various network appliances, etc.

In some examples, event results generated by the computerized model subsystem 105 are provided to one or more event action systems 109. The event action system 109 may include one or more computing devices that may be at a common geographic location or may be distributed across multiple geographic applications. The event action system 109 may take an action in response to the event result. Consider again the example above in which the events are credit applications. The event action system 109 may be programmed to process an accepted credit application and/or prepare a denial indication to denied credit applications. Returning to the example in which the events are transaction requests, the event action system 109 may be programmed to accept and/or reject a transaction request based on the result of the computerized model. For example, if a transaction request is indicated to be non-suspicious, the event action system 109 may process the transaction and/or refer the transaction to another system for further processing. If a transaction request is indicated to be suspicious, the event action system 109 may be programmed to reject the transaction and/or escalate it to another system or human user for further analysis. Consider also the example above in which the events are network access requests. The event access system 109 may be programmed to grant and/or deny the access requests, for example, based on the event results.

The visualization subsystem 107 generates and serves the UI 102 to the user computing devices 108A, 108B, for example, via the web server 106. For example, the visualization subsystem 107 may access event result data including, for example, event results generated using the computerized model and event feature data describing the event feature values used with the computerized model to generate the event results. The event result data can be accessed from a data store 114 associated with the model system 104 and/or from one or more external systems, such as the event feature data system 111. The visualization system 107 also accesses importance score data describing importance scores for one or more event features. The importance score data can be stored, for example, at the data store 114, generated by the visualization system 107 and/or received from another system.

In some examples, the computerized model can be implemented outside of the computing system 101. For example, event result data including event feature data may be provided to the model system 104 and stored at the data store 114. Accessing the event result data may involve reading from the data store 114.

The computing system 101 is described herein as including the model system 104, the web server 106, and the user computing device(s) 108A, 108B. In some examples, the computing system 101 may include more or fewer components. For example, various functionality described herein as being performed by the computing system 101 may be performed by any one or more of the model system 104, the web server 106, and/or the user computing devices 108A, 108B. Also, one or more of the model system 104, the web server 106, and/or the user computing devices 108A, 108B may be omitted in some examples.

The user computing devices 108A, 108B may be any suitable computing device or devices such as, for example, a smart phone, a tablet computer, a laptop computer, a smart watch, etc. User computing devices 108A, 108B comprise input/output (I/O) devices for providing the UI 102 to the user 112. For example, user computing devices 108A, 108B comprise a display for showing the UI 102 to a user 112. In some examples, user computing devices 108A, 108B execute an application 110A, 110B that facilitates the provision of the UI 102. In some examples, the application 110A, 110B is a web browser that communicates with the web server 106 to receive and display the UI 102. For example, the UI 102 may be or include a web page displayed at the user computing device 108A, 108B via the web browser. Also, in some examples, the application 110A, 110B is an application that otherwise communicates with the web server 106 and/or financial services system 104. For example, the application 110A, 110B may be or include a mobile or other application that includes an embedded web view or other view that receives a web document from the web server 106. Also, in some examples, the web server 106 is bypassed or eliminated and the application 110A, 110B communicates directly with the financial services system 104 to receive financial data, generate the UI 102, and/or serve the UI 102. Although two user computing devices 108A, 108B are shown in FIG. 1, in some examples, the user 112 receives the UI 102 at a single user computing device (e.g., one of 108A or 108B). In some examples, the user 112 receives the UI 102 at different user computing devices 108A, 108B at different times.

FIG. 1 also depicts an example screen 120 from the UI 102. The screen 120 includes a background area 122 with various visual indicators positioned thereon. The background area 122 and visual indicators on the background area 122 correspond to a single event. Each indicator corresponds to event features of the event. The visual indicators indicate event features corresponding to an example event. The size of the visual indicators correspond to the respective importance scores, with larger visual indicators corresponding to higher importance scores. In this example, the event is a credit application. The visual indicators in this example are text strings and the size of the visual indicators is also described as a font size or height.

The visual indicators may be the same color, or different colors. In some examples, the color of the visual indicators is chosen so that adjacent visual indicators are of different colors, to make it easier for the human user to recognize distinct visual indicators. In some examples, the color of a visual indicator may also correspond to the importance score. For example, event features with high importance scores may be rendered in a first color while event features with lower importance scores may be rendered in a different color.

In the example of FIG. 1, an indicator RT_SPRD_PCTG, indicating an event feature for rate spread percentage is the largest. This indicates that the value of the event feature for rate spread percentage had an importance score indicating a high importance. Other larger indicators include SCND_DNY_RSN and PROP_TYPE indicating a second reason for denial of the credit application and a property type offered as collateral for the credit, respectively. Smaller indicators corresponding to lower importance score event features include FIRST_DENY_RSN (a first reason for denial), THIRD_DENY_RSN (a third reason for denial), LOAN_TYPE (a type of loan applied for), LIEN_STAT (a type of lien), FLC_RACE (applicant race), (FLC_GENDER) (applicant gender), FLC_ETHNC (an applicant ethnic group), and TRCT_INCM_CAT (an income category).

Figure 2:
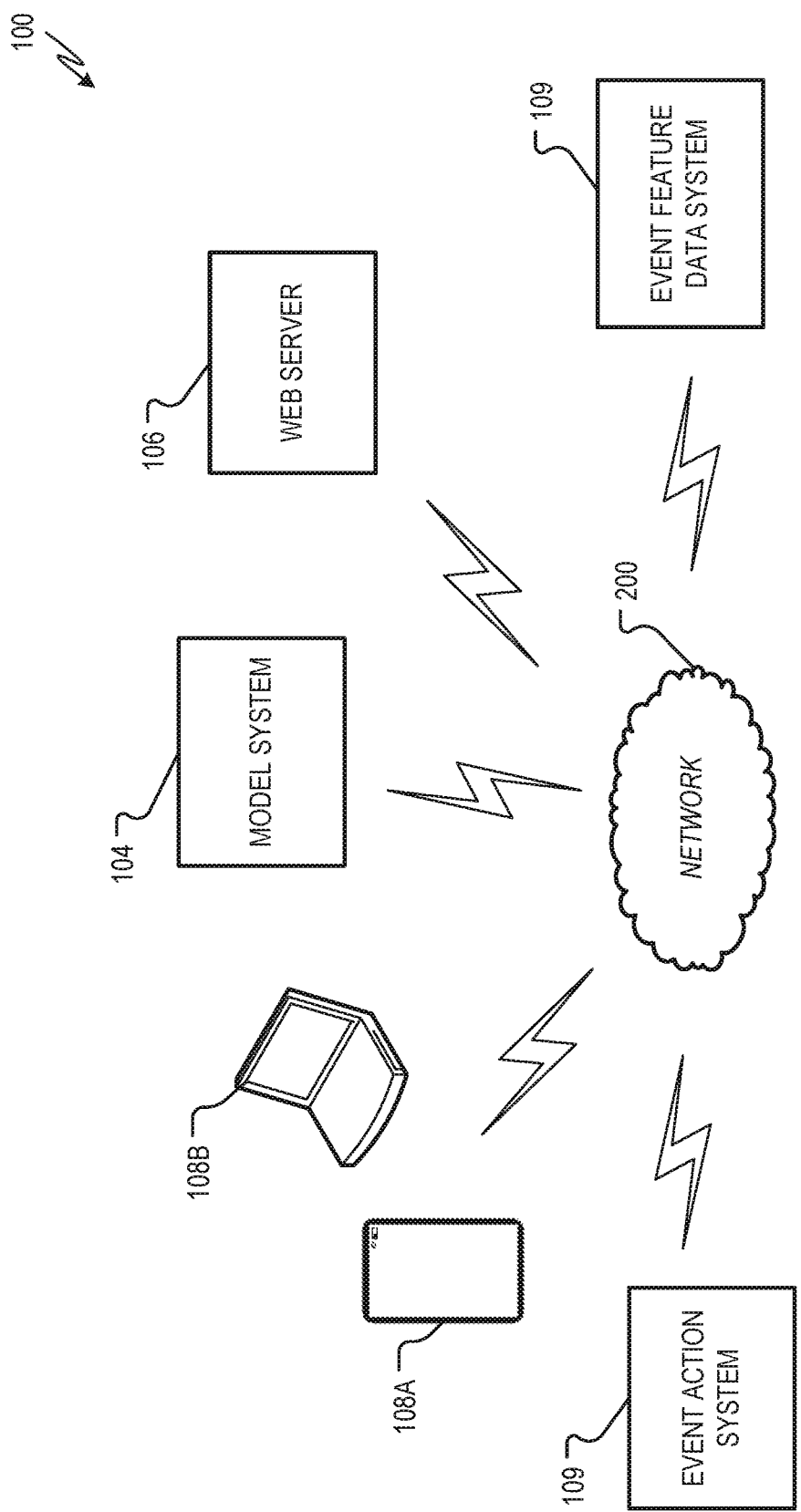
FIG. 2 is a diagram showing another example of the environment of FIG. 1 including additional details.

FIG. 2 is a diagram showing another example of the environment 100 including additional details. In the example of FIG. 2, the user computing devices 108A, 108B, web server 106, model system 104, event action system 109, and event feature data system 109 are in communication with one another via a network 200. The network 200 may be or comprise any suitable network element operated according to any suitable network protocol. For example, one or more portions of the network 200 may be an ad hoc network, an intranet, an extranet, a virtual private network (VPN), a local-area network (LAN), a wireless LAN (WLAN), a wide-area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, another type of network, or a combination of two or more such networks.

Figure 3:
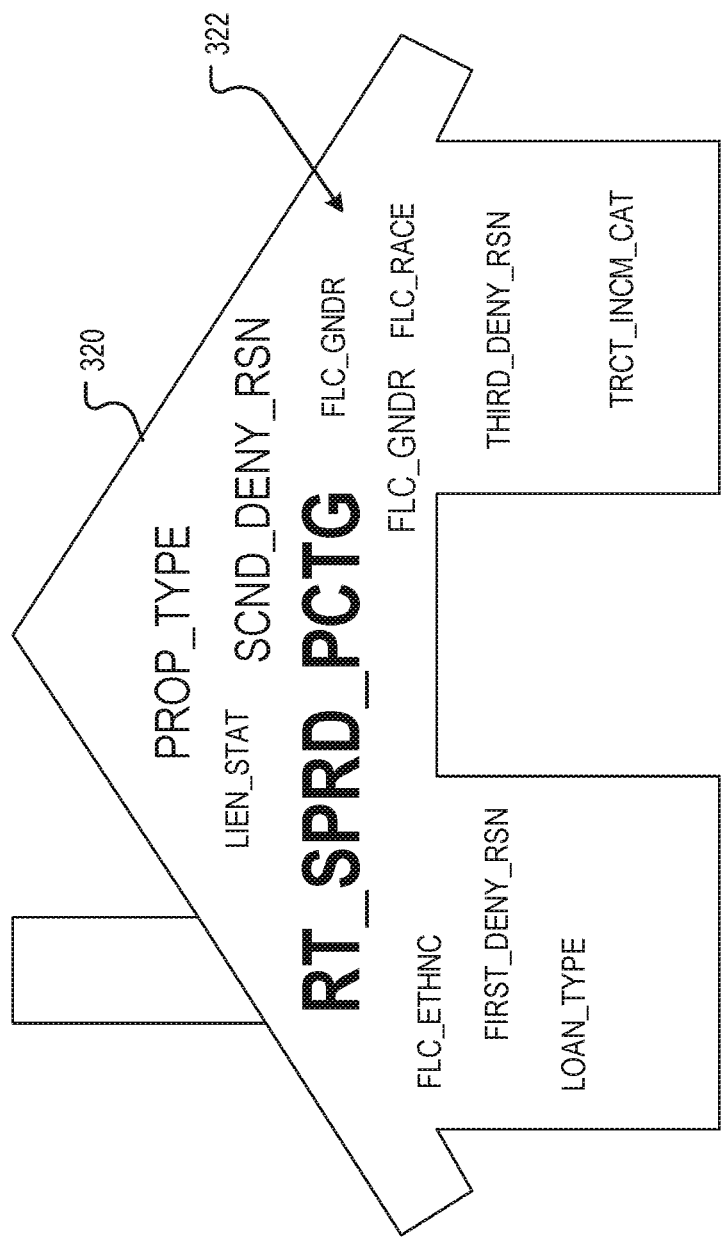
FIG. 3 is a diagram showing another example screen that may be provided with the user interface of FIG. 1.

FIG. 3 is a diagram showing another example screen 320 that may be provided with the UT 102. The screen 320 includes a background area 322 with various visual indicators positioned thereon. In the example of FIG. 3, the background area 322 is in the shape of a home. The visual indicators shown in FIG. 3 are related to a credit application event such as, for example, a credit application for a home mortgage. For example, the visual indicators shown on the example background area 322 include RT_SPRD_PCTG (rate spread percentage), FIRST_DENY_RSN (a first reason for denial), SCND_DNY_RSN (a second reason for denial), THIRD_DENY_RSN((a third reason for denial), LOAN_TYPE (a type of loan applied for), LIEN_STAT (a type of lien), FLC_RACE (applicant race), (FLC_GENDER) (applicant gender), FLC_ETHNC (an applicant ethnic group), and TRCT_INCM_CAT (an income category).

Figure 4:
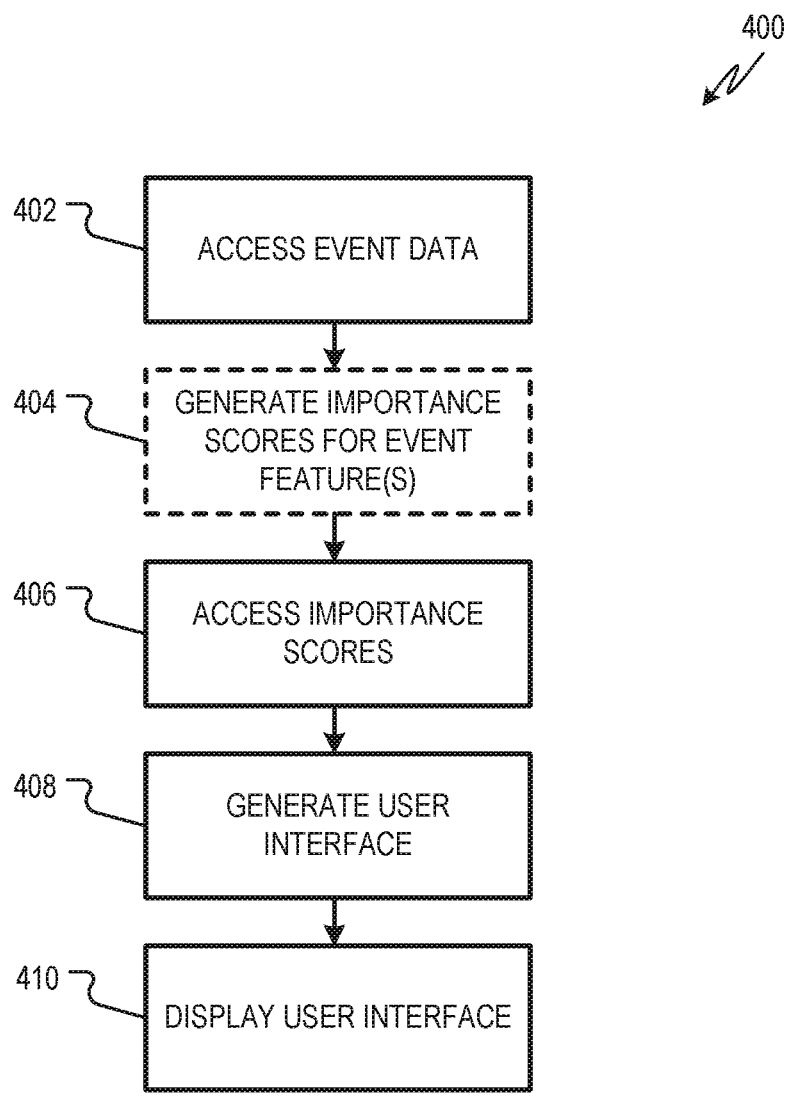
FIG. 4 is a flowchart showing one example of a process flow that can be executed by the model system of FIG. 1 to generate and display a user interface.

FIG. 4 is a flowchart showing one example of a process flow 400 that can be executed by the model system 104 (e.g., the visualization system 107 thereof) to generate and display a UI, such as the UI 102 of FIG. 1, At operation 402, the model system 104 receives event data. The event data includes event results for a set of events and sets of event features for each event. An event result for an event indicates the output of a computerized model describing the event. For example, returning to the example in which the events are credit applications, an event result describes whether the computerized model has classified the credit application as granted or denied. In the example in which the events are credit card or other transactions, the event result describes whether the events are suspicious or not suspicious. Event results can be accessed from the data store 114 and/or received from the computerized model subsystem 105 or other system executing the computerized model. Event features for an event are the event features considered by the computerized model to generate an event result. Event features can be accessed from a data store, such as the data store 114, and/or received from an external system, such as the event feature data system 111.

At optional operation 404, the model system 104 generates importance scores for some or all of the event features received at operation 402. Importance scores can be generated for all or a portion of the events described by the event result data. The importance scores can be generated in any suitable manner.

In some examples, the model system 104 generates importance scores at least in part by generating a secondary computerized model. The secondary computerized model is trained over a limited range of event feature values to generate a result that is the same as that of the primary computerized model, albeit in a more interpretable form. To generate importance scores for an event, the model system 104 may provide the event feature values corresponding to the event to the secondary computerized model and utilize the interpretable nature of the secondary computerized model to rate the importance of one or more event features of the event. Example techniques that may be used to generate importance scores using secondary computerized models include LIME techniques, PDP techniques, and SHAP techniques, among others. Another example technique for generating importance scores is described herein with respect to FIGS. 5-6.

At operation 406, the model system accesses importance scores corresponding to the event features of an event. In examples where the model system 104 generates the importance scores, accessing the importance scores can include accessing a data store including the importance scores, such as the data source 114 and/or receiving the importance scores from another component of the model system 104. In examples where the importance scores are generated by another system, accessing the importance scores can include receiving the importance scores from the system that generated the importance scores and/or an intermediate system.

At operation 408, the model system 104 generates the user interface 102. This can include generating one or more user interface screens, such as the screen 120 of FIG. 1 or the screen 320 of FIG. 3. In some examples, each screen corresponds to a single event, which may be an event that was detected to be anomalous, an event indicated by the user 112 or any other suitable event. Visual indicators on a screen correspond to some or all of features associated with the event depicted on the screen.

To generate the user interface, the model system 104 generates one or more screens for one or more different events. Generating a screen can include rendering a background area and positioning visual indicators for some or all of the event features of the corresponding event. The model system 104 may determine the size for the various visual indicators using importance score for the corresponding event features. The size of a visual indicator may be proportional to its importance score. For example, event features with higher importance scores may correspond to larger visual indicators. Similarly, event features with lower importance scores may correspond to smaller visual indicators. The positions of the visual indicators on the background area can be selected in any suitable manner. In some examples, visual indicators corresponding to event features having higher importance scores (e.g., indicating higher importance to the event result) are positioned nearer to the center of the background area than visual indicators corresponding to event features having lower importance scores.

At operation 410, the model system 104 displays the user interface at a screen of a computing device, such as the user computing devices 108A, 108B. In some examples, this includes uploading the user interface to the web server 106 where it can be made available to the user computing device 108A, 108B, for example, via applications 110A, 110B. In other examples, the processing flow 400 is executed by a computing system that includes a display and displaying the user interface includes displaying the user interface at the included display.

Figure 5:
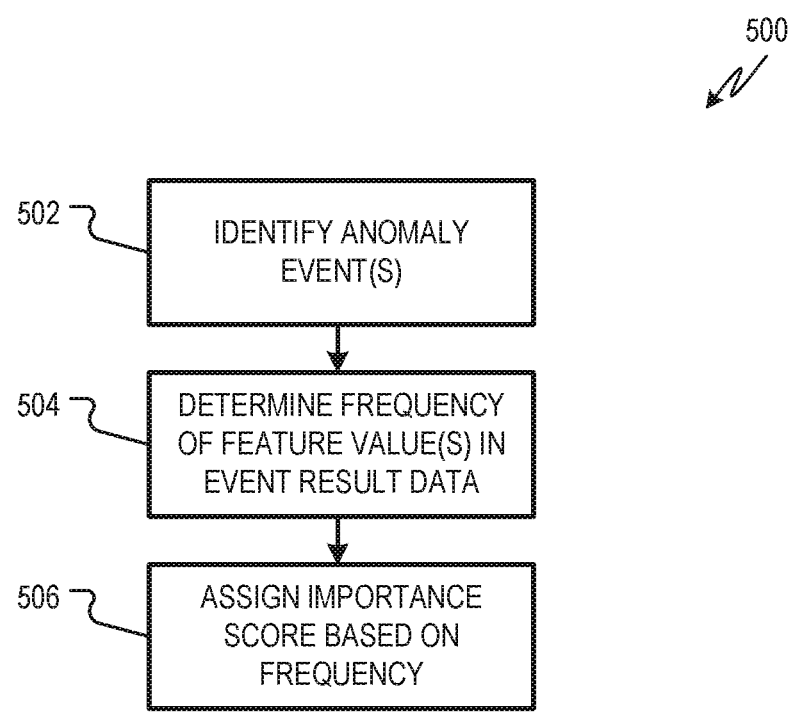
FIG. 5 is flowchart showing an example process flow that can be executed by the model system to generate an importance score for an event feature.

FIG. 5 is flowchart showing an example process flow 500 that can be executed by the model system 104 to generate an importance score for an event feature. For example, the process flow 500 can be used in addition to or instead of other methods described herein, such as LIME techniques, PDP techniques, and SHAP techniques, etc. At operation 502, the model system 104 identifies one or more anomalous events from a set of event result data. An anomalous event is an event that differs from other events described by the set of event result data, for example, because of differences in event results, event features, or combinations thereof.

Anomalous events can be identified in any suitable manner. In some examples, the model system 104 trains a secondary computerized model to classify events as anomalous or non-anomalous, The secondary computerized model can be supervised, semi-supervised, and/or unsupervised. The type of secondary computerized model can depend, for example, on the type of training data that is available. For example, if the model system 104 uses a training data set that include multiple examples of identified anomalous, then a supervised model such as, for example, an SVM model, a neural network model, etc. If the model system 104 has access to training data that is known to not include anomalies, a semi-supervised model may be used. Example semi-supervised models include one-class SVMs and autoencoders. Also, if no labeled training data is available, the model system 104 may utilize un-labeled training data with an unsupervised model.

At operation 504, the model system 104 determines the frequency in the event result data of the feature values of for anomalous events. Consider the example above in which the events are credit applications. A credit application event may have an event feature corresponding to a loan type (e.g., home equity, primary mortgage, unsecured, etc.). For a particular anomalous credit application event having a loan type feature value of "30-year fixed," finding the frequency of the feature value includes determining the number of other events described by the event result data that also have the value "30-year fixed" for the event feature loan type.

In some examples, the model system 104 bins event feature values to find frequency. Consider an example event feature "interest rate" for a credit application event. An interest rate may be expressed to multiple decimal points. Finding the frequency that a given interest rate value appears may not provide significant information. For example, consider an example in which the interest rate 5.375% appears ten times, but the interest rate 5.250% appears 100 times. Because there is a small practical difference between a 5.375% interest rate and a 5.250% interest rate, it may provide a more accurate indication of the importance of the ten instances of the 5,375% interest rate by considering those together with the 100 instances of the 5.250% interest rate. Accordingly, the model system 104 may generate bins or ranges of event feature values, assign a given event feature to a bin based on its value, and find the frequency of the event feature value by considering the frequency of event feature values in the same bin.

At operation 506, the model system 104 assigns an importance score to one or more feature values considered at operation 504 based on the frequency. The importance score may be inversely proportional to the frequency. For example, an event feature having a lower-frequency value may be assigned a higher importance score. For example, feature values that appear less often may tend to indicate event features that contributed to the reason that an event is anomalous.

Figure 6:
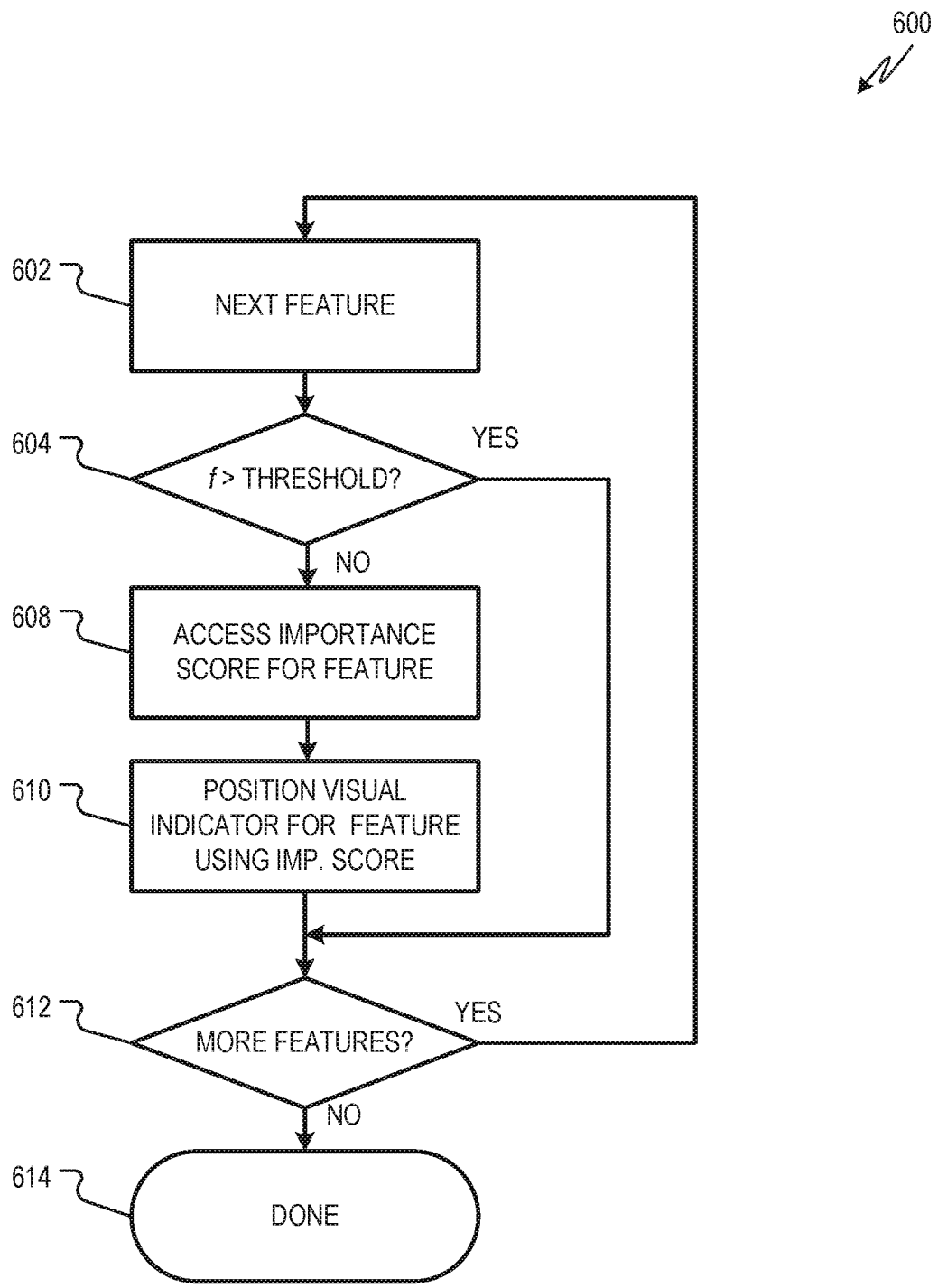
FIG. 6 is a flowchart showing one example of a process flow that may be executed to select event features from an anomalous event for display at the user interface described herein.

FIG. 6 is a flowchart showing one example of a process flow 600 that may be executed to select event features from an event for display at the user interface 102 described herein. For example, the model system 104 may not display visual icons corresponding to all of the event features of an event represented by a user interface screen, such as the screens 120, 320 described herein. In some examples, the number of event features may be too large to allow an equivalent number of visual indicators to be displayed. Also, it may be more difficult for a human user to recognize the most important event features if the background area is cluttered.

The process flow 600 is executed using a set of event features from a subject event that is to be displayed at the user interface 102. In some examples, the subject event is an anomalous event determined, for example, as described herein including with respect to FIG. 5. In other examples, the subject event is selected by a user such as, for example, the human user 112.

At operation 602, the model system considers a next feature of the subject event. At operation 604, the model system 104 determines if the feature value of the subject feature has a frequency in the event result data that is greater than a frequency threshold. If yes, this is an indication that the event feature is not of a high importance. The event feature may not be plotted on the user interface, Accordingly, the model system determines, at operation 612, whether there are additional event features for the subject event that have not yet been considered. If yes, the model system 104 considers the next feature at operation 602. If there are no more event features for the subject event, the process concludes at operation 614.

If the frequency of the feature is not less than the threshold at operation 604, indicating that the event feature value is rare, the model system may access an importance score for the event feature at operation 608. In some examples, this includes accessing a data store, such as data store 114, that includes an importance score for the event feature that was generated by another computing device. In other examples, the model system 104 generates the importance scores. Also, the importance score accessed at operation 608 may have been generated (by the model system 104 and/or another system) in any suitable manner. In some examples, the importance score is generated using techniques such as LIME techniques, PDP techniques, and SHAP techniques. In other examples, the importance score is determined as described herein with respect to FIG. 5.

At operation 610, the model system 104 positions a visual indicator for the event feature on a background area, for example, as described herein, based on the importance score. For example, the size of the visual indicator may be proportional to the importance score for the event feature. At operation 612, the model system 104 determines whether there are additional event features for the subject event that have not yet been considered. If there are additional event features, the model system 104 considers the next feature at operation 602. If there are no more event features for the subject event, the process concludes at operation 614.

Figure 7:
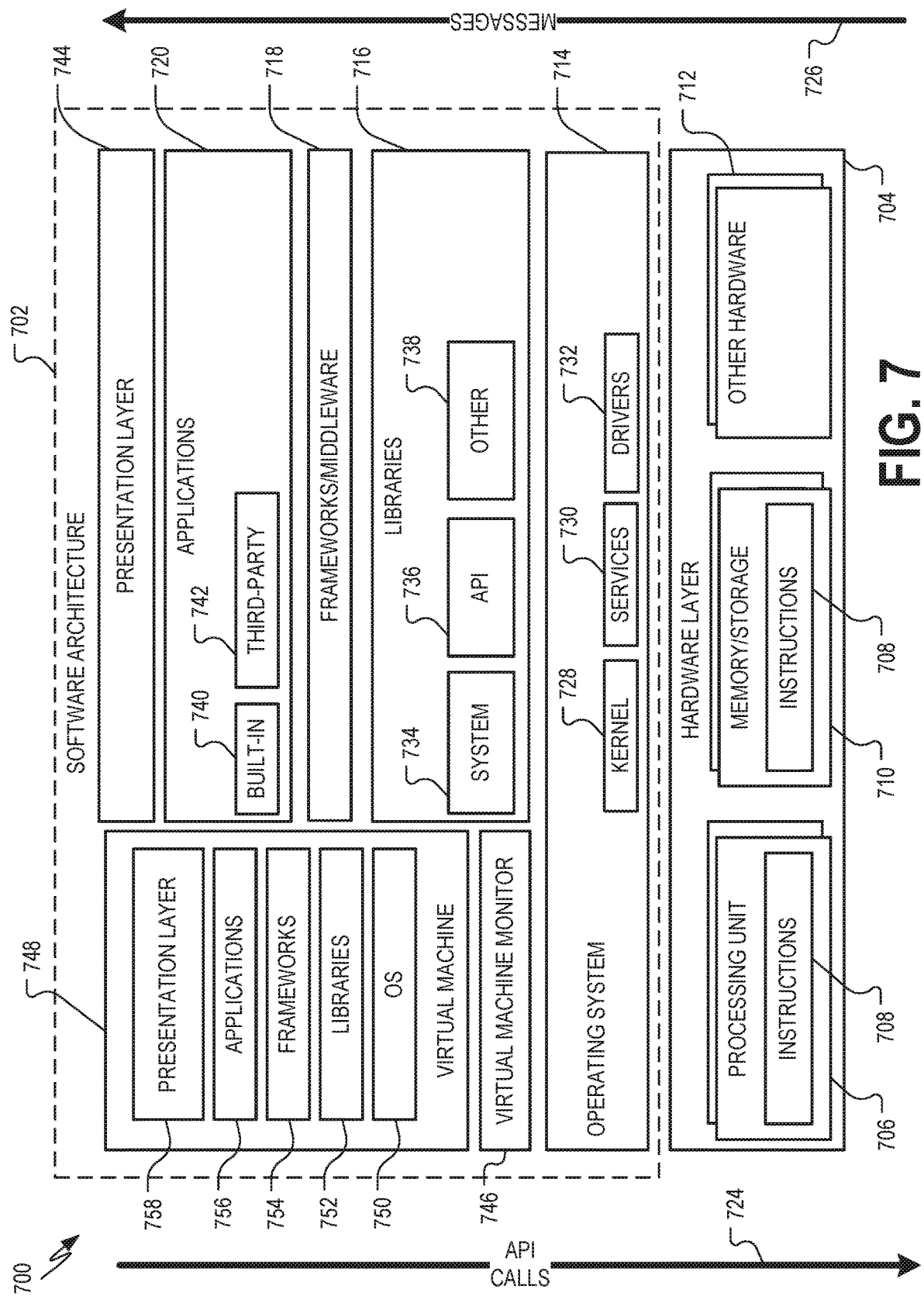
FIG. 7 is a block diagram showing one example of a software architecture for a computing device.

FIG. 7 is a block diagram 700 showing one example of a software architecture 702 for a computing device. The software architecture 702 may be used in conjunction with various hardware architectures, for example, as described herein. FIG. 7 is merely a non-limiting example of a software architecture 702, and many other architectures may be implemented to facilitate the functionality described herein. A representative hardware layer 704 is illustrated and can represent, for example, any of the above-referenced computing devices. In some examples, the hardware layer 704 may be implemented according to an architecture 800 of FIG. 8.

The representative hardware layer 704 comprises one or more processing units 706 having associated executable instructions 708. The executable instructions 708 represent the executable instructions of the software architecture 702, including implementation of the methods, modules, components, and so forth of FIGS. 1-5. The hardware layer 704 also includes memory and/or storage modules 710, which also have the executable instructions 708. The hardware layer 704 may also comprise other hardware 712, which represents any other hardware of the hardware layer 704, such as the other hardware illustrated as part of the architecture 800.

In the example architecture of FIG. 7, the software architecture 702 may be conceptualized as a stack of layers where each layer provides particular functionality. For example, the software architecture 702 may include layers such as an operating system 714, libraries 716, frameworks/middleware 718, applications 720, and a presentation layer 744. Operationally, the applications 720 and/or other components within the layers may invoke application programming interface (API) calls 724 through the software stack and receive a response, returned values, and so forth illustrated as messages 726 in response to the API calls 724. The layers illustrated are representative in nature and not all software architectures have all layers. For example, some mobile or special-purpose operating systems may not provide a frameworks/middleware 718 layer, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. In some examples, the services 730 include an interrupt service. The interrupt service may detect the receipt of a hardware or software interrupt and, in response, cause the software architecture 702 to pause its current processing and execute an Interrupt Service Routine (ISR) when an interrupt is received. The ISR may generate an alert.

The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 716 may provide a common infrastructure that may be utilized by the applications 720 and/or other components and/or layers. The libraries 716 typically provide functionality that allows other software modules to perform tasks in an easier fashion than by interfacing directly with the underlying operating system 714 functionality (e.g., kernel 728, services 730, and/or drivers 732). The libraries 716 may include system libraries 734 (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The frameworks 718 (also sometimes referred to as middleware) may provide a higher-level common infrastructure that may be utilized by the applications 720 and/or other software components/modules. For example, the frameworks 718 may provide various graphical user interface (GUI) functions, high-level resource management, high-level location services, and so forth. The frameworks 718 may provide a broad spectrum of other APIs that may be utilized by the applications 720 and/or other software components/modules, some of which may be specific to a particular operating system or platform.

The applications 720 include built-in applications 740 and/or third-party applications 742. Examples of representative built-in applications 740 may include, but are not limited to, a contacts application, a browser application, a book reader application, a location application, a media application, a messaging application, and/or a game application. The third-party applications 742 may include any of the built-in applications 740 as well as a broad assortment of other applications. In a specific example, the third-party application 742 (e.g., an application developed using the Android™ or iOS™ software development kit (SDK) by an entity other than the vendor of the particular platform) may be mobile software running on a mobile operating system such as iOS™, Android™, Windows® Phone, or other computing device operating systems. In this example, the third-party application 742 may invoke the API calls 724 provided by the mobile operating system such as the operating system 714 to facilitate functionality described herein.

The applications 720 may utilize built-in operating system functions (e.g., kernel 728, services 730, and/or drivers 732), libraries (e.g., system libraries 734, API libraries 736, and other libraries 738), or frameworks/middleware 718 to create user interfaces to interact with users of the system. Alternatively, or additionally, in some systems, interactions with a user may occur through a presentation layer, such as the presentation layer 744. In these systems, the application/module "logic" can be separated from the aspects of the application/module that interact with a user.

Some software architectures utilize virtual machines. For example, systems described herein may be executed utilizing one or more virtual machines executed at one or more server computing machines. in the example of FIG. 7, this is illustrated by a virtual machine 748. A virtual machine creates a software environment where applications/modules can execute as if they were executing on a hardware computing device, The virtual machine 748 is hosted by a host operating system (e.g., the operating system 714) and typically, although not always, has a virtual machine monitor 746, which manages the operation of the virtual machine 748 as well as the interface with the host operating system (e.g., the operating system 714). A software architecture executes within the virtual machine 748, such as an operating system 750, libraries 752, frameworks/middleware 754, applications 756, and/or a presentation layer 758. These layers of software architecture executing within the virtual machine 748 can be the same as corresponding layers previously described or may be different.

Figure 8:
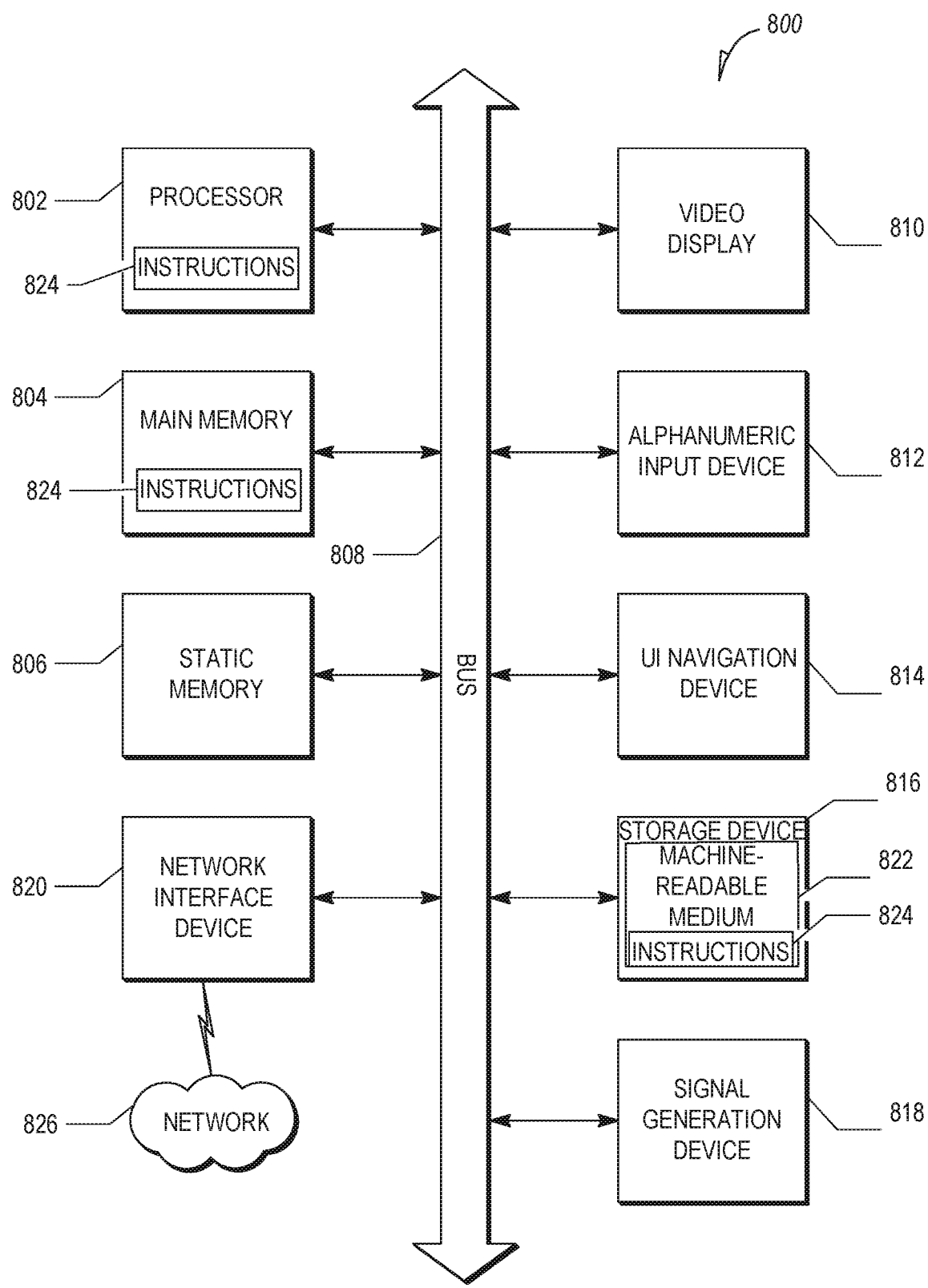
FIG. 8 is a block diagram illustrating a computing device hardware architecture, within which a set or sequence of instructions can be executed to cause a machine to perform examples of any one of the methodologies discussed herein.

FIG. 8 is a block diagram illustrating a computing device hardware architecture 800, within which a set or sequence of instructions can be executed to cause a machine to perform examples of any one of the methodologies discussed herein. The architecture 800 may describe, for example, any of the computing devices and/or control circuits described herein, The architecture 800 may execute the software architecture 702 described with respect to FIG. 7. The architecture 800 may operate as a standalone device or may be connected (e.g., networked) to other machines. In a networked deployment, the architecture 800 may operate in the capacity of either a server or a client machine in server-client network environments, or it may act as a peer machine in peer-to-peer (or distributed) network environments. The architecture 800 can be implemented in a personal computer (PC), a tablet PC, a hybrid tablet, a set-top box (STB), a personal digital assistant (PDA), a mobile telephone, a web appliance, a network router, a network switch, a network bridge, or any machine capable of executing instructions (sequential or otherwise) that specify operations to be taken by that machine.

The example architecture 800 includes a processor unit 802 comprising at least one processor (e.g., a central processing unit (CPU), a graphics processing unit (GPU), or both, processor cores, compute nodes, etc.). The architecture 800 may further comprise a main memory 804 and a static memory 806, which communicate with each other via a link 808 (e.g., a bus). The architecture 800 can further include a video display unit 810, an alphanumeric input device 812 (e.g., a keyboard), and a UI navigation device 814 (e.g., a mouse). In some examples, the video display unit 810, alphanumeric input device 812, and UI navigation device 814 are incorporated into a touchscreen display. The architecture 800 may additionally include a storage device 816 (e.g., a drive unit), a signal generation device 818 (e.g., a speaker), a network interface device 820, and one or more sensors (not shown), such as a GPS sensor, compass, accelerometer, or other sensor.

In some examples, the processor unit 802 or another suitable hardware component may support a hardware interrupt. In response to a hardware interrupt, the processor unit 802 may pause its processing and execute an ISR, for example, as described herein.

The storage device 816 includes a non-transitory machine-readable medium 822 on which is stored one or more sets of data structures and instructions 824 (e.g., software) embodying or utilized by any one or more of the methodologies or functions described herein. The instructions 824 can also reside, completely or at least partially, within the main memory 804, within the static memory 806, and/or within the processor unit 802 during execution thereof by the architecture 800, with the main memory 804, the static memory 806, and the processor unit 802 also constituting machine-readable media. The instructions 824 stored at the machine-readable medium 822 may include, for example, instructions for implementing the software architecture 702, instructions for executing any of the features described herein, etc.

While the machine-readable medium 822 is illustrated in an example to be a single medium, the term "machine-readable medium" can include a single medium or multiple media (e.g., a centralized or distributed database, and/or associated caches and servers) that store the one or more instructions 824. The term "machine-readable medium" shall also be taken to include any tangible medium that is capable of storing, encoding, or carrying instructions for execution by the machine and that cause the machine to perform any one or more of the methodologies of the present disclosure, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM) and electrically erasable programmable read-only memory (EEPROM)) and flash memory devices; magnetic disks such as internal hard disks and removable disks; magneto-optical disks; and CD-ROM and DVD-ROM disks.

The instructions 824 can further be transmitted or received over a communications network 826 using a transmission medium via the network interface device 820 utilizing any one of a number of well-known transfer protocols (e.g., hypertext transfer protocol (HTTP)). Examples of communication networks include a LAN, a WAN, the Internet, mobile telephone networks, plain old telephone service (POTS) networks, and wireless data networks (e.g., Wi-Fi, 3G, and 5G LTE/LTE-A or WiMAX networks). The term "transmission medium" shall be taken to include any intangible medium that is capable of storing, encoding, or carrying instructions for execution by the machine, and includes digital or analog communications signals or other intangible media to facilitate communication of such software.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein, as embodiments can feature a subset of said features. Further, embodiments can include fewer features than those disclosed in a particular example. Thus, the following claims are hereby incorporated into the Detailed Description, with each claim standing on its own as a separate embodiment. The scope of the embodiments disclosed herein is to be determined with reference to the appended claims, along with the full scope of equivalents to which such claims are entitled.

What is claimed is:

1. A system of visualizing decisions of a computerized model, the system comprising:
at least one processor unit; and
a data store comprising instructions thereon that, when executed by the at least one processor unit, causes the at least one processor unit to perform operations comprising:
accessing computerized model result data, the computerized model result data comprising event results for a plurality of events, a first event result for a first event of the plurality of events being generated using the computerized model and a first set of event features comprising a first event feature and a second event feature;
using a secondary computerized model to generate secondary computerized model result data, the generating of the secondary computerized model result data based at least in part on the first set of event features;

using the secondary computerized model result data to assign a first importance score to the first event feature, the first importance score indicating a significance of the first event feature to the first event result;

using the secondary computerized model result data to assign a second importance score to the second event feature, the second importance score indicating a significance of the second event feature to the first event result, and the second importance score indicating a greater importance than the first importance score;

generating a user interface for display to a human user, the user interface comprising:
- a background area having a first shape, the first shape being associated with a type of the first event;
- a first visual indicator positioned on the background area and correlated to the first event feature, wherein a size of the first visual indicator corresponds to the first importance score; and
- a second visual indicator positioned on the background area and correlated to the second event feature, wherein a size of the second visual indicator corresponds to the second importance score, and wherein the size of the second visual indicator is larger than the size of the first visual indicator; and displaying the user interface at a display screen of a computing device.

2. The system of claim 1, the first visual indicator comprising text, a height of the text correlated to the first importance score.

3. The system of claim 1, the first visual indicator being a first color and the second visual indicator being a second color different than the first color.

4. The system of claim 1, the computerized model result data also comprising sets of event features for the plurality of events, the operations further comprising determining that a value of the first event feature for the first event appears in the sets of event features a first frequency less than a threshold frequency.

5. The system of claim 4, the operations further comprising:
generating a plurality of event feature bins,
a first event feature bin of the plurality of event feature bins comprising event features from the sets of event features having values within a first threshold range,
a second event feature bin of the plurality of event feature bins comprising event features of from the sets of event features having values within a second threshold range,
the first event feature bin comprising the first event feature, and
the first frequency being a frequency of even event features that are part of e first event feature bin.

6. The system of claim 4, the operations further comprising determining that a value of the second event feature for the first event appears in the sets of event features at a second frequency that is less than the first frequency, wherein the second importance score is based at least in part on the second frequency.

7. The system of claim 1, wherein generating the user interface further comprises:
positioning the first visual indicator at a first position on the background area; and
positioning the second visual indicator at a second position on the background area, wherein the second position is closer to a center of the background area than the first position.

8. A method of visualizing decisions of a computerized model, the method comprising:

accessing, by at least one processor unit, computerized model result data, the computerized model result data comprising event results for a plurality of events, a first event result for a first event of the plurality of events being generated using the computerized model and a first set of event features comprising a first event feature and a second event feature;

using a secondary computerized model, by at least one processor unit, to generate secondary computerized model result data, the generating of the secondary computerized model result data based at least in part on the first set of event features;

using the secondary computerized model result data, by at least one processor unit, to assign a first importance score to the first event feature, the first importance score indicating a significance of the first event feature to the first event result;

using the secondary computerized model result data, by at least one processor unit, to assign a second importance score to the second event feature, the second importance score indicating a significance of the second event feature to the first event result, and the second importance score indicating a greater importance than the first importance score;

generating, by at least one processor unit, a user interface for display to a human user, the user interface comprising:
- a background area having a first shape, the first shape being associated with a type of the first event;
- a first visual indicator positioned on the background area and correlated to the first event feature, wherein a size of the first visual indicator corresponds to the first importance score; and
- a second visual indicator positioned on the background area and correlated to the second event feature, wherein a size of the second visual indicator corresponds to the second importance score, and wherein the size of the second visual indicator is larger than the size of the first visual indicator; and displaying, by at least one processor unit, the user interface at a display screen of a computing device.

9. The method of claim 8, the first visual indicator comprising text, a height of the text correlated to the first importance score.

10. The method of claim 8, the first visual indicator being a first color and the second visual indicator being a second color different than the first color.

11. The method of claim 8, the computerized model result data also comprising sets of event features for the plurality of events, further comprising determining that a value of the first event feature for the first event appears in the sets of event features a first frequency less than a threshold frequency.

12. The method of claim 11, further comprising:
generating a plurality of event feature bins,
a first event feature bin of the plurality of event feature bins comprising event features from the sets of event features having values within a first threshold range,
a second event feature bin of the plurality of event feature bins comprising event features of from the sets of event features having values within a second threshold range,
the first event feature bin comprising the first event feature,
the first frequency being a frequency of even event features that are part of e first event feature bin.

13. The method of claim 11, further comprising determining that a value of the second event feature for the first event appears in the sets of event features at a second frequency that is less than the first frequency, wherein the second importance score is based at least in part on the second frequency.

14. The method of claim 8, wherein generating the user interface further comprises:
- positioning the first visual indicator at a first position on the background area; and
- positioning the second visual indicator at a second position on the background area, wherein the second position is closer to a center of the background area than the first position.

15. A non-transitory machine-readable medium comprising instructions thereon that, when executed by at least one processor unit, cause the at least one processor unit to execute operations comprising:
- accessing computerized model result data, the computerized model result data comprising event results for a plurality of events, a first event result for a first event of the plurality of events being generated using a computerized model and a first set of event features comprising a first event feature and a second event feature;
- using a secondary computerized model to generate secondary computerized model result data, the generating of the secondary computerized model result data based at least in part on the first set of event features;
- using the secondary computerized model result data to assign a first importance score to the first event feature, the first importance score indicating a significance of the first event feature to the first event result;
- using the secondary computerized model result data to assign a second importance score to the second event feature, the second importance score indicating a significance of the second event feature to the first event result, and the second importance score indicating a greater importance than the first importance score;
- generating a user interface for display to a human user, the user interface comprising:
  - a background area having a first shape, the first shape being associated with a type of the first event;
  - a first visual indicator positioned on the background area and correlated to the first event feature, wherein a size of the first visual indicator corresponds to the first importance score; and
  - a second visual indicator positioned on the background area and correlated to the second event feature, wherein a size of the second visual indicator corresponds to the second importance score, and wherein the size of the second visual indicator is larger than the size of the first visual indicator; and
- displaying the user interface at a display screen of a computing device.

16. The non-transitory medium of claim 15, the first visual indicator comprising text, a height of the text correlated to the first importance score.

17. The non-transitory medium of claim 15, the first visual indicator being a first color and the second visual indicator being a second color different than the first color.

* * * * *

UNITED STATES PATENT AND TRADEMARK OFFICE
CERTIFICATE OF CORRECTION

PATENT NO. : 11,599,579 B1
APPLICATION NO. : 17/305439
DATED : March 7, 2023
INVENTOR(S) : Nadav et al.

It is certified that error appears in the above-identified patent and that said Letters Patent is hereby corrected as shown below:

In the Claims

In Column 15, Line 52, in Claim 5, after "of", delete "even"

In Column 15, Line 53, in Claim 5, delete "e" and insert --the-- therefor

In Column 16, Line 66, in Claim 12, after "of", delete "even"

In Column 16, Line 67, in Claim 12, delete "e" and insert --the-- therefor

In Column 18, Line 25, in Claim 16, after "non-transitory", insert --machine-readable--

In Column 18, Line 28, in Claim 17, after "non-transitory", insert --machine-readable--

Signed and Sealed this
Fifteenth Day of August, 2023

Katherine Kelly Vidal
*Director of the United States Patent and Trademark Office*